United States Patent [19]
D'Agostino et al.

[11] Patent Number: 5,483,991
[45] Date of Patent: Jan. 16, 1996

[54] VALVE WITH SELF-CENTERING SEAT

[75] Inventors: Guy D'Agostino, Vitry Sur Seine; Rachid Belhamici, Massy, both of France

[73] Assignee: Societe Nationale d'Etude et de Construction de Moteurs d'Aviation "S.N.E.C.M.A.", Paris, France

[21] Appl. No.: 238,531

[22] Filed: May 5, 1994

[30] Foreign Application Priority Data

May 12, 1993 [FR] France .................................. 93 05693

[51] Int. Cl.⁶ .............................. F16K 15/02; F16K 25/00
[52] U.S. Cl. .......................... 137/514; 137/538; 137/904; 251/64; 251/362; 251/363
[58] Field of Search ..................................... 137/514, 538, 137/540, 543.21, 904; 251/64, 85, 324, 333, 363, 362

[56] References Cited

U.S. PATENT DOCUMENTS

| | | | |
|---|---|---|---|
| 2,143,399 | 1/1939 | Abercrombie | 251/362 X |
| 2,173,986 | 7/1955 | Suthann | 251/86 |
| 2,717,001 | 9/1955 | Perrault | 137/514 |
| 3,092,133 | 6/1963 | Clark | 137/538 X |
| 3,834,666 | 9/1974 | Keith | 251/361 |
| 3,857,408 | 12/1974 | Rhodes et al. | 137/514 |
| 4,506,690 | 3/1985 | Mitchell | 251/362 X |
| 5,064,169 | 11/1991 | Alberts et al. | 137/904 X |
| 5,193,579 | 3/1993 | Bauer et al. | 137/540 |

FOREIGN PATENT DOCUMENTS

| | | | |
|---|---|---|---|
| 0463289 | 1/1992 | European Pat. Off. . | |
| 2201416 | 4/1974 | France . | |
| 835448 | 3/1952 | Germany | 251/363 |
| 975826 | 11/1964 | United Kingdom | 251/85 |

*Primary Examiner*—John Rivell
*Attorney, Agent, or Firm*—Bacon & Thomas

[57] ABSTRACT

A valve is disclosed having a valve piston slidably movable within a valve casing. The valve also includes a spring biasing the valve piston against a valve seat such that the valve is normally closed, but may be opened when the pressure acting on the valve piston exceeds the biasing force of the spring. In order to assure perfect sealing between the valve piston and the valve seat, the valve seat is formed on a member which is movably mounted in the valve casing by a generally annular elastic element. The elastic element connects the valve seat to the valve casing, as well as a shoulder extending from the valve casing into the valve chamber,d such that an axial clearance exist between the valve seat member and the shoulder, and a radial clearance exists between the valve seat member and the valve casing under all operating conditions of the valve. Such clearances enable the valve seat member to move axially and radially so as to assure perfect sealing between the valve seat and the valve piston.

6 Claims, 1 Drawing Sheet

VALVE WITH SELF-CENTERING SEAT

BACKGROUND OF THE INVENTION

The present invention relates to a valve, more particularly a valve having a seat movably attached to the valve casing such that the seat may be self-centered so as to sealingly contact the valve piston.

Operational control of a gas turbine engine is accomplished by control apparatus which may include electrical, electronic, hydraulic and pneumatic components. The control apparatus may also include valves, such as check valves having casings in which a piston is slidably mounted. In order to assure the sealing of the valve, the piston may be spring biased against a valve seat which, as a rule, is fixed in position relative to the valve casing.

Complete sealing is assured only if the piston surface rests against the entire cooperating seat surface. However, machining tolerances in the fabrication of the valve may cause clearances to exist between the piston and the valve casing thereby resulting in imperfect centering of the piston relative to the valve seat. Moreover, if the piston is biased by a spring, the spring may generate a force which is not coaxial with the piston axis. This will cause the force to be unevenly spread along the valve seat, and lateral components of the non-axial piston force may jam the piston against the casing thereby causing it to move further off center relative to the valve seat. The known valve constructions entail the drawbacks of poor sealing between the valve piston and the valve seat in addition to the possibility of jamming the piston within the valve casing.

SUMMARY OF THE INVENTION

A valve is disclosed having a valve piston slidably movable within a valve casing. The valve also includes a spring biasing the valve piston against a valve seat such that the valve is normally closed, but may be opened when the pressure acting on the valve piston exceeds the biasing force of the spring. In order to assure perfect sealing between the valve piston and the valve seat, the valve seat is formed on a member which is movably mounted in the valve casing by a generally annular elastic element. The elastic element connects the valve seat to the valve casing, as well as a shoulder extending from the valve casing into the valve chamber, such that an axial clearance exists between the valve seat member and the shoulder, and a radial clearance exists between the valve seat member and the valve casing under all operating conditions of the valve. Such clearances enable the valve seat member to move axially and radially so as to assure perfect sealing between the valve seat and the valve piston.

The valve seat member defines a generally annular channel in which the annular elastic element is mounted, the radial and axial dimensions of the elastic dement being greater than the radial and axial dimensions of the annular channel to establish the clearances between the valve seat member and the shoulder, as well as the valve seat member and the valve casing. A ring attached to the valve casing will bear against the valve seat member when the piston is withdrawn out of contact with the valve seat member, the location of the ring being such that the elastic element is pre-stressed in a direction toward the annular shoulder.

DETAILED DESCRIPTION OF THE PREFERRED EMBODIMENT

Figure 1:
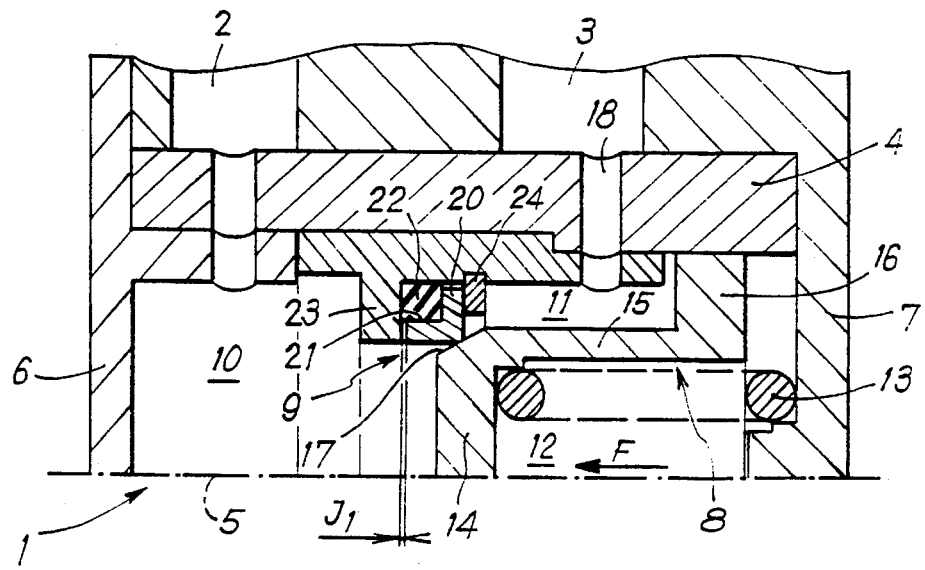
FIG. 1 is a partial, cross-sectional view of a valve according to the present invention.

The valve according to the present invention is illustrated as a check valve, but it is to be understood that the principles elucidated herein are equally applicable to other valve types. As best seen in FIG. 1, the valve 1 according to the present invention controls fluid which is moved from a first chamber 2 into a second chamber 3. The valve 1 comprises a generally cylindrical casing 4 which extends about longitudinal axis 5 and which is closed at its opposite ends by end walls 6 and 7 so as to define an inner chamber. Valve piston 8 is slidably mounted within the cylindrical casing 4 and cooperates with a valve seat 9 which is attached to the casing 4 and which is located between end walls 6 and 7 so as to divide the inner chamber of the casing 4 into an upstream chamber 10, which communicates with first chamber 2, and a downstream chamber 11, which communicates with second chamber 3 via orifice 18.

Valve piston 8 is located in the downstream chamber 11 and defines an inner cavity 12 which opens in a direction facing the end wall 7 and in which is located a compression spring 13. Compression spring 13 bears against end wall 7 and front wall 14 of piston 8 so as to apply a force to the piston 8 in the direction of arrow F urging the piston 8 toward the upstream chamber 10. As can be seen, force F acts in a direction substantially parallel to the longitudinal axis 5 thereby enabling the piston to move within the casing 4 in a direction parallel to longitudinal axis 5.

Figure 2:
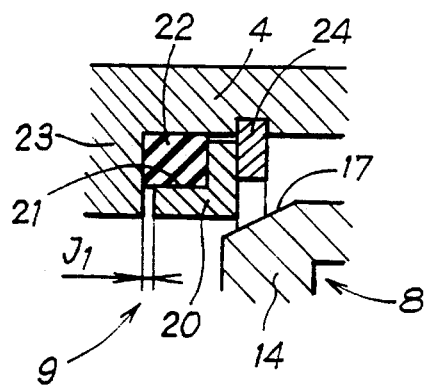
FIG. 2 is a partial, cross-sectional view of the valve illustrated in FIG. 1 with the valve piston withdrawn from contact with the valve seat.

Valve piston 8 further comprises a generally annular wall 15 spaced radially inwardly from the casing 4 which connects the front wall 14 to an annular rear wall 16 which extends outwardly and is in sliding, sealing contact with the cylindrical casing 4. Valve piston 8 also includes a spherical or frusto-conical sealing surface 17 located at the intersection of front wall 14 and annular wall 15. Sealing surface 17 normally comes into sealing contact with a corresponding sealing surface on the valve seat 9 so as to close off fluid communication between the upstream chamber 10 and the downstream chamber 11. When the pressure of the fluid in upstream chamber 10 exceeds the biasing force F exerted on piston 8 by spring 13, the piston 8 will be moved towards the right, as illustrated in the Figures, thereby disengaging the sealing surface 17 from the sealing surface of valve seat 9, as illustrated in FIG. 2. Such movement of the valve piston 8 enables fluid communication between the upstream chamber 10 and the downstream chamber 11.

Figure 3:
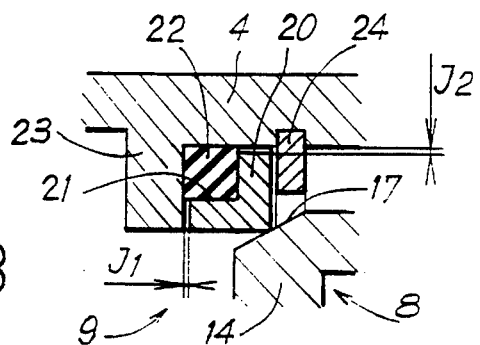
FIG. 3 is a partial, cross-sectional view of the valve illustrated in FIGS. 1 and 2 with the valve piston in contact with the valve seat.

The valve seat 9 comprises a valve seat member 20 defining a generally annular channel 21 which faces away from the side of the valve seat member 20 which faces towards the valve piston 8. An elastic element 22 is received in annular channel 21 and attaches the valve seat member 20 to the valve casing 4 and to the annular shoulder 23 which extends radially inwardly into the inner chamber from the cylindrical casing 4. As can be seen, both the radial and axial dimensions of the elastic element 22 are greater than the corresponding radial and axial dimensions of the valve seat member 20 such that, when the elastic element 22 is attached to the valve casing 4 and to the annular shoulder 23, an axial clearance $J_1$ will exist between the valve seat member 20 and the annular shoulder 23, and a radial clearance $J_2$ will exist between the valve seat member 20 and the valve casing 4 under all operating conditions of the valve. The valve seat member 20 is held in place in the valve casing 4 by a ring 24 which is attached to the valve casing 4 and which extends inwardly into the downstream chamber 11. As best illustrated in FIG. 2, when the piston 8 is urged away from the valve seat 9, the valve seat member 20 will contact the ring 24 so as to prevent any further displacement into the downstream chamber 11. The axial dimensions of the elastic element 22 and the annular channel 21 are such that, when the valve seat member 20 is in contact with the ring 24, as illustrated in FIG. 2, the elastic element 22 is pre-stressed in a direction towards the annular shoulder 23. The compressibility of the elastic element 22 is such that, when the valve piston 8 is biased toward the closed position in contact with the valve seat 9, as illustrated in FIG. 3, the spring force F is insufficient to bring the valve seat member 20 into contact with the annular shoulder 23, thereby providing clearance $J_1$ between these elements. The clearances $J_1$ and $J_2$ allow axial and radial displacement of the valve seat member 20 relative to the valve casing 4 so as to enable the sealing surface of the valve seat 9 to completely contact the sealing surface 17 of the piston thereby completely sealing off any possible fluid communication between upstream chamber 10 and downstream chamber 11.

The valve seat member 20 may be made of an elastomeric material and the elastic element 22 may be permanently bonded thereto. The selected bonding means will, of course, be effective against the fluids to be utilized within the valve, as well as against environmental and operating conditions such as pressure and temperature.

The foregoing description is provided for illustrative purposes only and should not be construed as in any way limiting this invention, the scope of which is defined solely by the appended claims.

We claim:

1. A valve comprising:

a) a generally cylindrical casing having a longitudinal axis and defining an inner chamber;

b) a generally annular shoulder extending into the inner chamber from the generally cylindrical casing;

c) a valve piston movably located in the inner chamber so as to be movable in a direction parallel to the longitudinal axis, the valve piston defining a sealing surface extending obliquely to the longitudinal axis;

d) a valve seat member defining a valve seat located in the inner chamber;

e) at least one generally annular elastic element connected to the valve seat member, the generally cylindrical casing and the generally annular shoulder such that an axial clearance is maintained under all operating conditions between the valve seat member and the generally annular shoulder and a radial clearance is maintained between the valve seat member and the generally cylindrical casing whereby the valve member may move axially and radially relative to the valve piston due to contact between the oblique sealing surface of the valve piston and the valve seat to ensure sealing of the valve seat against the oblique sealing surface; and, f) biasing means acting on the valve piston so as to bias the valve piston towards the valve seat member.

2. The valve of claim 1 further comprising a generally annular channel defined by the valve seat member in which the at least one generally annular elastic element is located.

3. The valve of claim 2 wherein the generally annular channel and the at least one generally annular elastic element have radial and axial dimensions such that the radial and axial dimensions of the at least one generally annular elastic element are greater than the corresponding radial and axial dimensions of the generally annular channel.

4. The valve of claim 1 further comprising a ring attached to the casing and extending into the inner chamber, the ring located so as to contact the valve seat member when the valve piston is displaced from the valve seat member and pre-stressing the at least one generally annular elastic member towards the generally annular shoulder.

5. The valve of claim 1 wherein the biasing means comprises a compression spring.

6. The valve of claim 5 wherein the generally cylindrical casing has an end wall defining an end of the inner chamber and wherein the compression spring is interposed between the valve piston and the end wall.

* * * * *